(12) United States Patent
Pierron et al.

(10) Patent No.: US 9,631,836 B2
(45) Date of Patent: Apr. 25, 2017

(54) DEVICE FOR ELECTRICALLY HEATING FLUID FOR A MOTOR VEHICLE, AND RELATED HEATING AND/OR AIR-CONDITIONING APPARATUS

(71) Applicant: Valeo Systemes Thermiques, Le Mesnil Saint Denis (FR)

(72) Inventors: Frederic Pierron, Rambouillet (FR); Bertrand Puzenat, Montigny le Bretonneux (FR); Jose Leborgne, Luisant (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 328 days.

(21) Appl. No.: 14/381,796

(22) PCT Filed: Feb. 1, 2013

(86) PCT No.: PCT/EP2013/052001
§ 371 (c)(1),
(2) Date: Aug. 28, 2014

(87) PCT Pub. No.: WO2013/127596
PCT Pub. Date: Sep. 6, 2013

(65) Prior Publication Data
US 2015/0071625 A1    Mar. 12, 2015

(30) Foreign Application Priority Data

Feb. 29, 2012    (FR) ...................................... 12 00603

(51) Int. Cl.
*A47J 31/00*    (2006.01)
*F24H 3/00*    (2006.01)
(Continued)

(52) U.S. Cl.
CPC ........... *F24H 3/002* (2013.01); *B60H 1/2221* (2013.01); *H05B 1/0236* (2013.01); *B60H 2001/2278* (2013.01); *H05B 2203/023* (2013.01)

(58) Field of Classification Search
None
See application file for complete search history.

(56) References Cited

U.S. PATENT DOCUMENTS 2,266,216 A * 12/1941 Kimberlin ............... F02N 19/10
219/208
3,626,148 A * 12/1971 Woytowich ............. F02N 19/10
123/142.5 E
(Continued)

FOREIGN PATENT DOCUMENTS

EP    1 872 986 A1    1/2008
EP    2 353 898 A1    8/2011
WO    WO 03/086018 A1    10/2003

OTHER PUBLICATIONS

International Search Report for Application No. PCT/EP2013/052001 dated Feb. 28, 2013, 5 pages.
(Continued)

*Primary Examiner* — Thor Campbell
(74) *Attorney, Agent, or Firm* — Howard & Howard Attorneys PLLC

(57) ABSTRACT

The invention relates to a device for electrically heating fluid for a motor vehicle, characterized in that it comprises: at least one heating module (2a, 2b) comprising at least one heating element (7a, 7b) and defining a circuit (7a, 7b) for guiding the fluid to be heated; a means (3) for controlling the heating element (7a, 7b), comprising an electric current switch (14a, 14b) connected to said heating element (7a, 7b) and a heat sink (15) having a first surface (19), which is to contact the fluid, and a second surface (19), which is to
(Continued)

Figure 1:
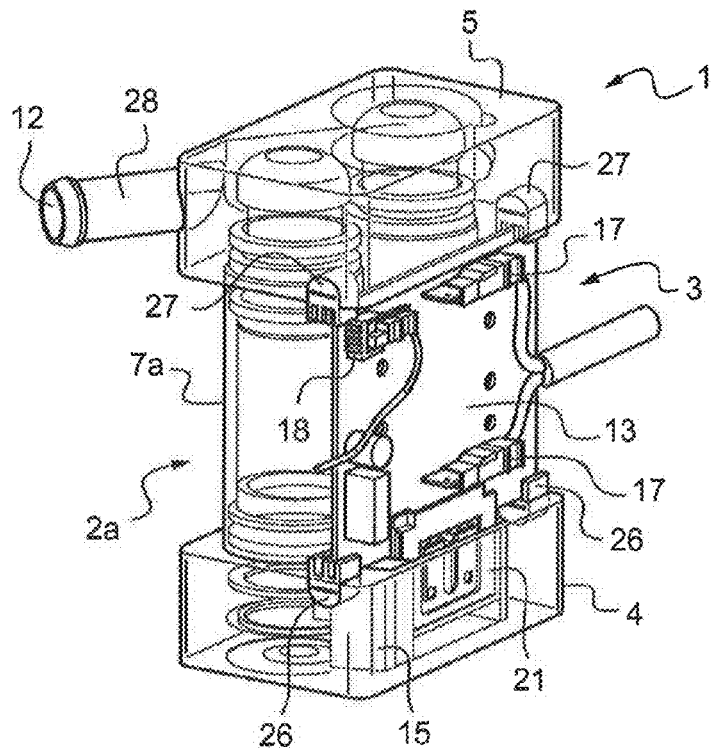

contact a sole plate (16) of said electric current switch (14a, 14b). The invention also relates to a heating and/or air-conditioning apparatus for a motor vehicle, including at least one such electric-heating device (1).

17 Claims, 6 Drawing Sheets

(51) Int. Cl.
*B60H 1/22* (2006.01)
*H05B 1/02* (2006.01)

(56) References Cited

U.S. PATENT DOCUMENTS

| | | | | |
|---|---|---|---|---|
| 3,943,325 A * | 3/1976 | Pickard | ............ | B60K 11/02 123/142.5 E |
| 4,208,570 A * | 6/1980 | Rynard | ............ | F02N 19/10 123/142.5 E |
| 4,372,260 A * | 2/1983 | Baker | ............ | B01D 35/18 123/142.5 E |
| 4,770,134 A * | 9/1988 | Foreman | ............ | F02N 19/10 123/142.5 R |
| 5,408,960 A * | 4/1995 | Woytowich | ............ | F02N 19/02 123/142.5 E |
| 5,806,479 A * | 9/1998 | Bauer | ............ | B60H 1/032 123/142.5 R |
| 5,855,319 A * | 1/1999 | Burner | ............ | B60H 1/032 237/12.3 B |
| 6,034,352 A * | 3/2000 | Gortler | ............ | B60H 1/2209 219/202 |
| 6,093,909 A * | 7/2000 | Beetz | ............ | B60H 1/2221 219/202 |
| 6,422,190 B1 * | 7/2002 | Gortler | ............ | B60H 1/22 123/142.5 R |
| 6,724,983 B1 * | 4/2004 | Humburg | ............ | B60H 1/22 165/41 |
| 6,919,535 B2 * | 7/2005 | Uhl | ............ | B60H 1/2225 165/80.3 |
| 7,200,327 B2 | 4/2007 | Pierron et al. | | |
| 7,484,556 B2 * | 2/2009 | Mita | ............ | C09K 5/06 165/135 |
| 7,574,987 B2 * | 8/2009 | Preiholt | ............ | F02N 19/10 123/142.5 E |
| 7,977,606 B2 * | 7/2011 | Adachi | ............ | H05B 3/50 219/202 |
| 8,901,457 B2 * | 12/2014 | Adachi | ............ | B60H 1/2221 219/202 |
| 8,948,582 B2 * | 2/2015 | Kominami | ............ | F24H 9/20 165/175 |
| 9,119,232 B2 * | 8/2015 | Clauss | ............ | H05B 3/24 |
| 9,127,762 B2 * | 9/2015 | Oh | ............ | F16H 57/0413 |
| 9,161,391 B2 * | 10/2015 | Niederer | ............ | H05B 3/24 |
| 9,279,599 B2 * | 3/2016 | Lee | | |
| 9,295,108 B2 * | 3/2016 | Bohlender | ............ | H05B 3/24 |
| 9,296,275 B2 * | 3/2016 | Huyghe | ............ | B60H 1/2225 |
| 9,362,740 B1 * | 6/2016 | Elnar | ............ | A61H 33/0095 |
| 9,377,244 B2 * | 6/2016 | Kominami | ............ | F28D 1/00 |
| 2006/0196448 A1 * | 9/2006 | Hayworth | ............ | B60S 1/488 122/6.6 |
| 2007/0284457 A1 * | 12/2007 | Shank | ............ | B05B 9/002 239/135 |
| 2008/0000889 A1 | 1/2008 | Niederer et al. | | |
| 2008/0053981 A1 * | 3/2008 | Adachi | ............ | H05B 3/50 219/202 |
| 2008/0138052 A1 * | 6/2008 | Wu | ............ | B60S 1/487 392/465 |
| 2009/0107974 A1 * | 4/2009 | Testa | ............ | B60H 1/034 219/208 |
| 2011/0180617 A1 * | 7/2011 | Saito | ............ | B60H 1/2221 236/49.3 |
| 2012/0037606 A1 * | 2/2012 | Huang | ............ | B60S 1/488 219/201 |
| 2012/0055913 A1 * | 3/2012 | Huang | ............ | B60S 1/488 219/202 |
| 2015/0197134 A1 * | 7/2015 | Carter | ............ | F01P 11/04 165/41 |

OTHER PUBLICATIONS

English language abstract for EP 1 872 986 extracted from espacenet.com database on Oct. 6, 2014, 2 pages.
English language abstract for WO 03/086018 extracted from espacenet.com database on Oct. 6, 2014, 2 pages.

\* cited by examiner

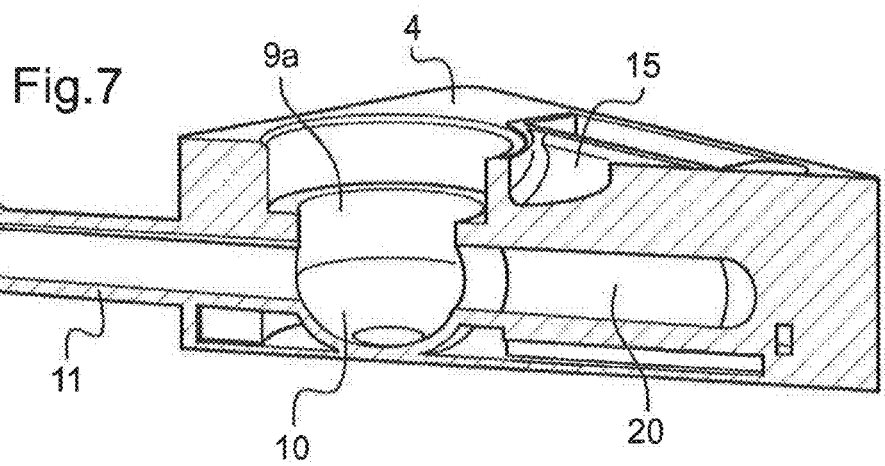
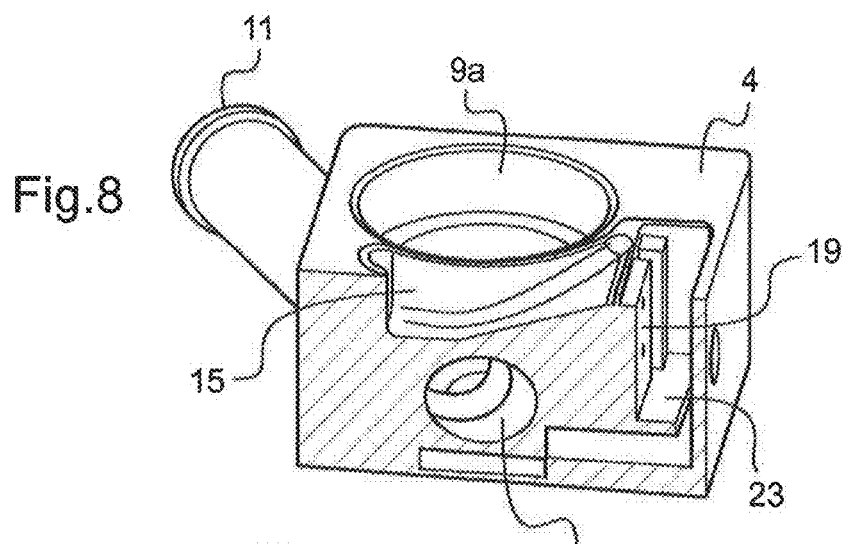
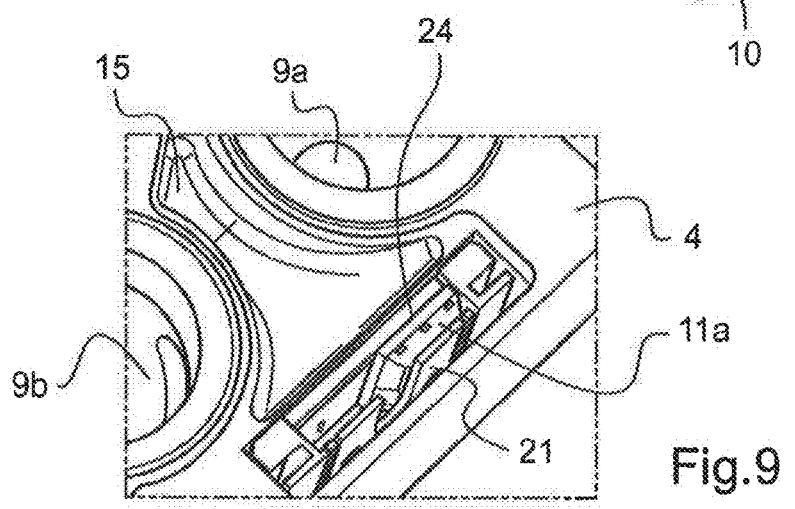

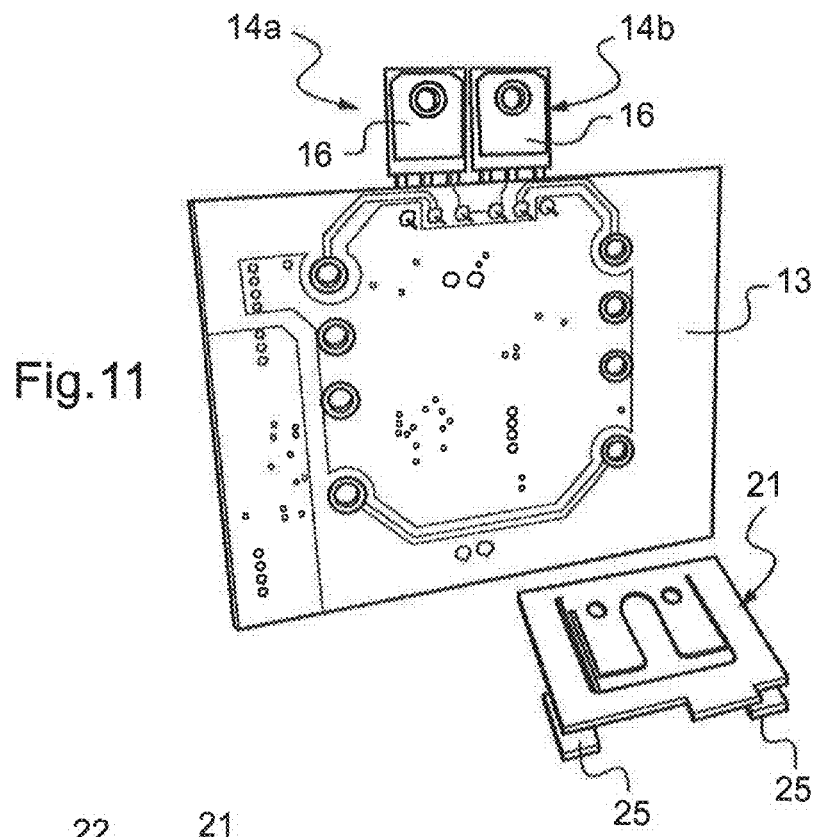
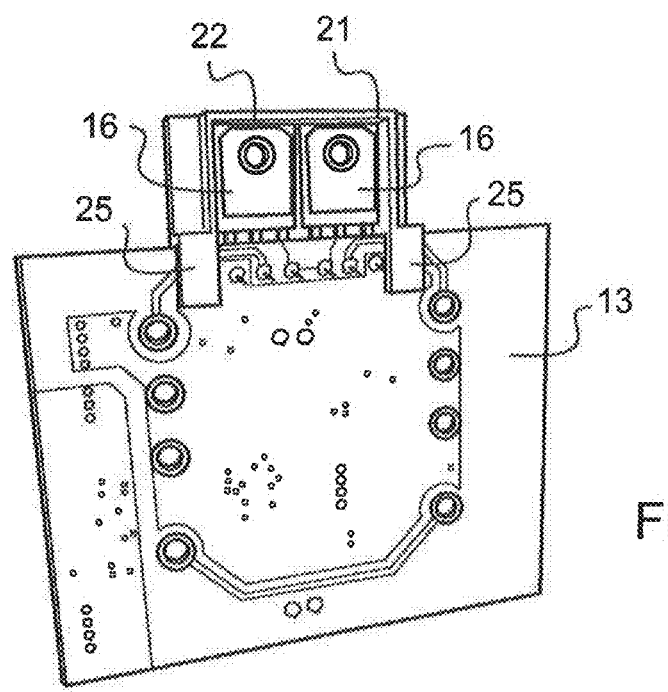
Fig.11
Fig.12

DEVICE FOR ELECTRICALLY HEATING FLUID FOR A MOTOR VEHICLE, AND RELATED HEATING AND/OR AIR-CONDITIONING APPARATUS

RELATED APPLICATIONS

This application is the National Stage of International Patent Application No. PCT/EP2013/052001, filed on Feb. 1, 2013, which claims priority to and all the advantages of French Patent Application No. FR 12/00603, filed on Feb. 29, 2012, the content of which is incorporated herein by reference.

The invention relates to a device for electrically heating fluid for a motor vehicle. The invention relates in particular to heating and/or air-conditioning apparatuses for motor vehicles comprising a heating device of this type.

Usually, the air intended for heating the passenger compartment of a motor vehicle, as well as the air intended for demisting and for de-icing, is heated by an airflow passing through a heat exchanger, more specifically by an exchange of heat between the airflow and a fluid. This fluid is generally the coolant in the case of a heat engine. However, this type of heating may prove to be unsuitable or insufficient for ensuring rapid and efficient heating of the passenger compartment of the vehicle, in particular for ensuring heating of the passenger compartment or de-icing or demisting before using the vehicle in a very cold environment, or when a very rapid increase in temperature is desired.

In addition, in the case of an electric vehicle, the heating function is no longer performed by coolant circulating in the heat exchanger. A water circuit may however be provided for heating the passenger compartment, but this type of heating may also prove to be unsuitable or insufficient for ensuring rapid and efficient heating of the passenger compartment of the vehicle.

Moreover, in order to reduce the size and the costs arising owing to the additional water circuit, it is also known to use an air-conditioning loop operating in heat-pump mode for the electric vehicle. Thus, the air-conditioning loop which conventionally allows an airflow to be cooled by means of a refrigerant is, in this case, used to heat the airflow. In order to do this, an evaporator of the air-conditioning loop, such as a condenser, should be used. However, this type of heating may also prove to be unsuitable or insufficient. Indeed, the performance of the air-conditioning loop in heat-pump mode depends on external climatic conditions, and in the case of outside air having too low a temperature, this air cannot be used as a source of heat energy.

A known solution consists in joining an additional electrical heating device to the heat exchanger, to the water circuit or to the air-conditioning loop. The additional electrical heating device may be capable of heating, upstream, the fluid, such as the coolant for the heat engine, or of heating the water in the water circuit for heating the passenger compartment of the electric vehicle or of heating the refrigerant of the air-conditioning loop.

The additional electrical heating device comprises a heating element in contact with the fluid to be heated. The implementation of the heating element is controlled by a control means comprising an electric-current switch for allowing and/or prohibiting the implementation of the heating element to which it is connected. However, it is noted that the switch tends to heat up when it is implemented and that this heating may disrupt the operation thereof.

The problem addressed by the present invention is therefore that of proposing a device for electrically heating fluid in a motor vehicle and a heating and/or air-conditioning apparatus for motor vehicles having improved reliability when implemented.

For this purpose, the invention relates to a device for electrically heating fluid for a motor vehicle, characterised in that it comprises:
- at least one heating module comprising at least one heating element and defining a guide circuit for the fluid to be heated,
- a means for controlling the heating element comprising an electric-current switch connected to said heating element and a heat sink having a first surface which is intended to be in contact with the fluid and a second surface which is in thermal contact with a base plate of said electric-current switch.

The electrical heating device may further have one or more of the following features, taken in isolation or in combination:
- the heating device comprises a fluid inlet housing in which an inlet channel for the fluid to be heated is formed, said inlet channel communicating with the circuit for guiding the fluid, said first surface of the heat sink delimiting said inlet channel at least in part, said second surface being outside said inlet channel,
- the second surface is formed in a receiving portion of the heat sink which receives a switch mounting of the control module housing at least one electric-current switch, said switch mounting having an opening exposing the base plate of the electric-current switch and said switch mounting being received in the receiving portion with the opening being oriented opposite said second surface,
- said switch mounting comprises a means for being removably fixed to an electric-circuit mounting of the control means,
- the heating device comprises two heating modules, the fluid inlet housing having a first cavity which receives an inlet end of the first heating module and a second cavity which receives an inlet end of the second heating module, said inlet channel connecting said cavities in parallel,
- the first surface of the heat sink, which delimits the inlet channel at least in part, is formed by the inner surface of a pipe of the inlet channel connecting the first cavity to the second cavity in the fluid inlet housing,
- the general shape of the heat sink extends between the cavities in the fluid inlet housing,
- the heat sink comprises a metal material,
- the heating device comprises a thermal interface interposed between the heat sink and the base plate of the electric-current switch,
- the thermal interface is an electrically insulating and thermally conductive film,
- the thermal interface comprises a phase-change material,
- the fluid inlet housing comprises a first means for positioning an electric-circuit mounting of the control means,
- the heating device comprises a fluid outlet housing in which an outlet channel for the fluid is formed, said outlet channel communicating with the circuit for guiding the fluid, said fluid outlet housing and said fluid inlet housing being respectively connected to the opposite ends of the heating modules,
- the fluid outlet housing has a second means for positioning the electric-circuit mounting of the control means.

The invention also relates to a heating and/or air-conditioning apparatus for a motor vehicle, characterised in that it comprises an electrical heating device as defined above.

The first surface of the heat sink is thus in contact with the fluid circulating in the heating device, while the second surface of the heat sink is in thermal contact with the base plate of the electric-current switch. "Thermal contact" either means that the second surface of the heat sink is pressed against the base plate of the switch in direct contact without an intermediary, or that the second surface of the heat sink is pressed against the base plate of the switch with a thermally conductive interface which promotes the exchange of heat between the heat sink and the switch being interposed.

The circulation of the fluid in the heating device is thus used to dissipate the heat generated by the electric-current switch, by thermal conduction in the heat sink and then by removing the heat in the fluid.

Since the fluid is colder when it arrives in the fluid inlet housing than when it is output from the operating heating modules, the arrangement of the heat sink in the fluid inlet housing allows this dissipation of heat in the fluid which is still "cold" to be optimised.

The heating device is thus more reliable, without increasing the size thereof. In addition, the heat energy produced by the electric-current switch contributes to heating the fluid passing through the heat sink.

A further advantage consists in the possibility of using electric-current switches which do not need to withstand the high temperatures that an electrical heating device would cause if it did not comprise a heat sink.

Moreover, the use of a switch mounting allows the electric-current switch to be positioned on the mounting when the electric-circuit mounting and the fluid inlet housing and outlet housing are being assembled and when the heating device is being assembled. The switch mounting also allows the electric-current switch to be protected against any mechanical impacts, particularly when it needs to be handled and/or while it is being assembled. Finally, the switch mounting forms a robust mechanical interface between the electric-current switch, the electric-circuit mounting and the other elements of the heating device.

Figure 2:
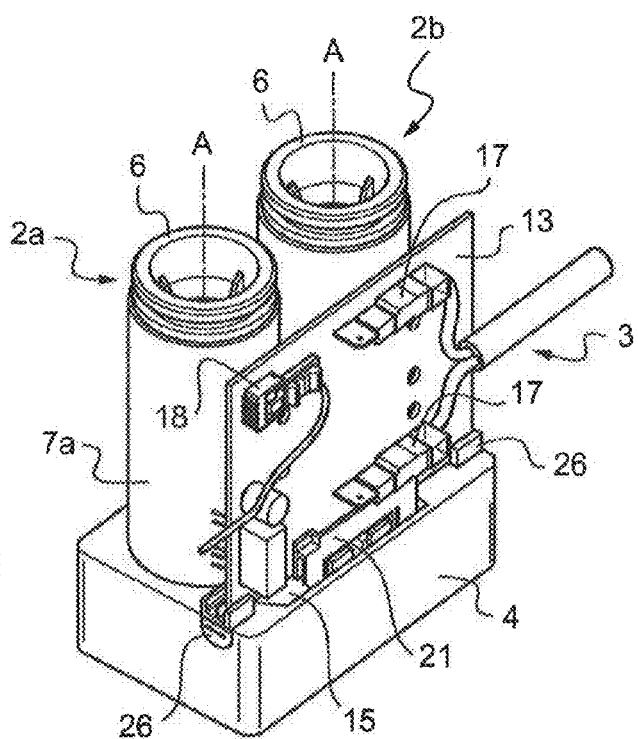
Figure 3:
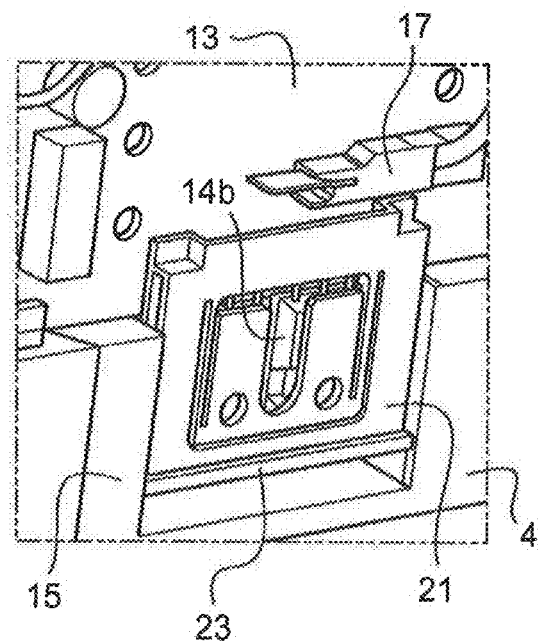
Figure 4:
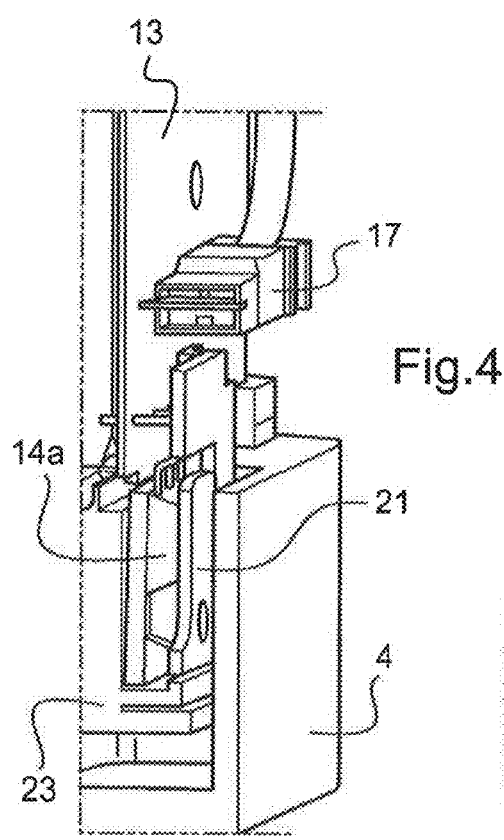
Figure 13:
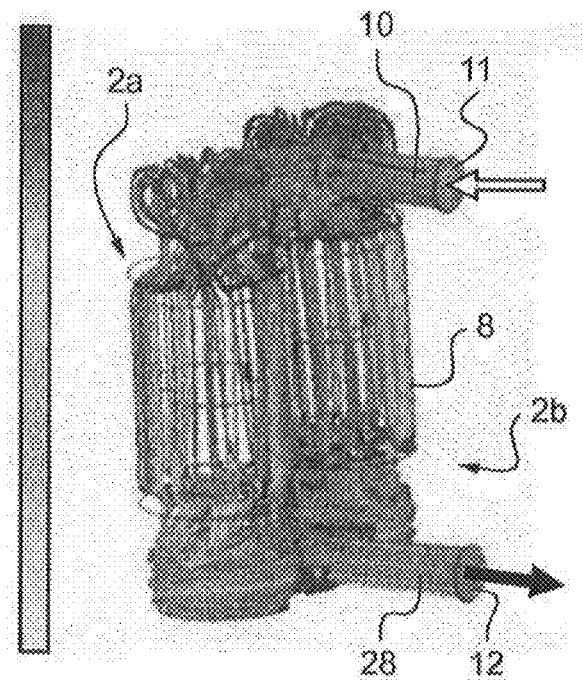
Figure 5:
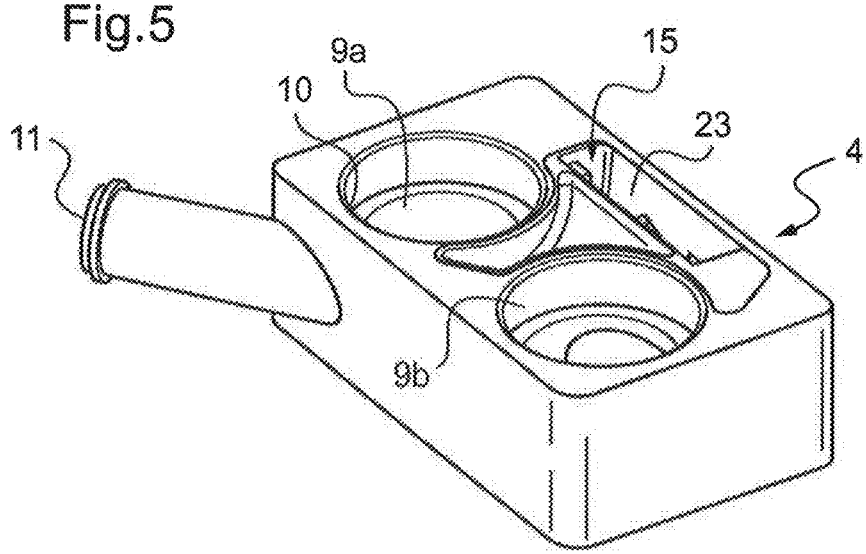
Figure 6:
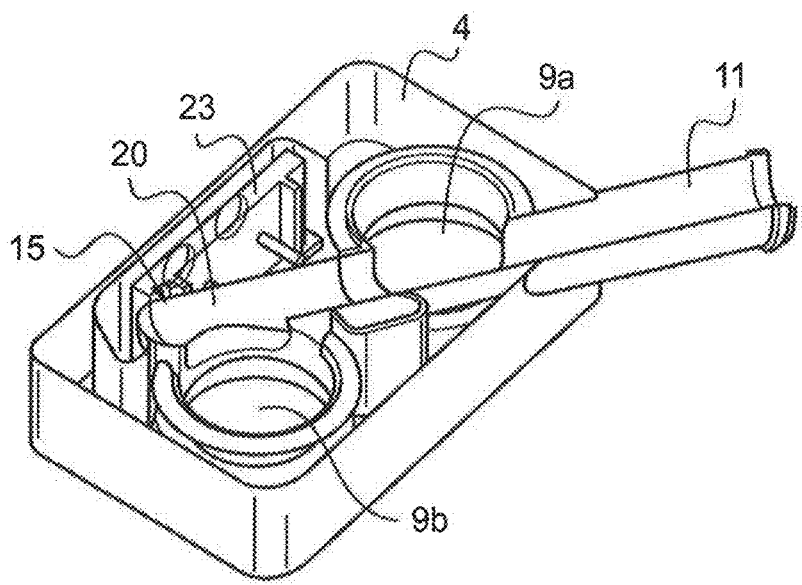
Figure 10A:
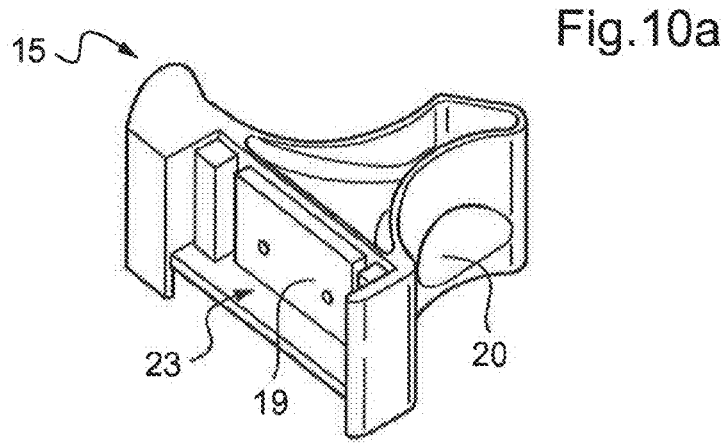
Figure 10B:
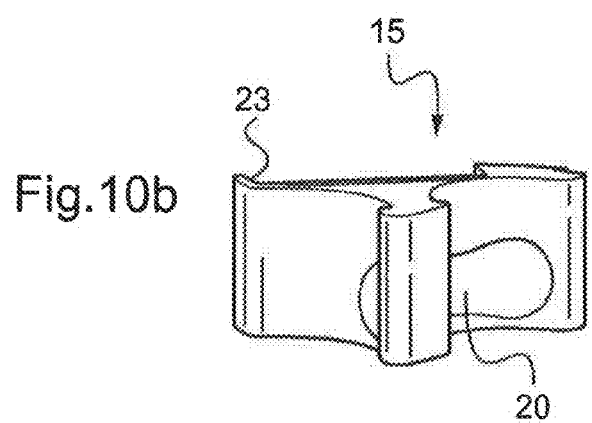
Figure 10C:
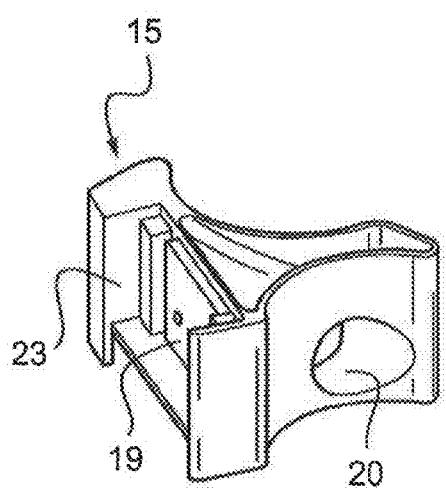
Figure 10D:
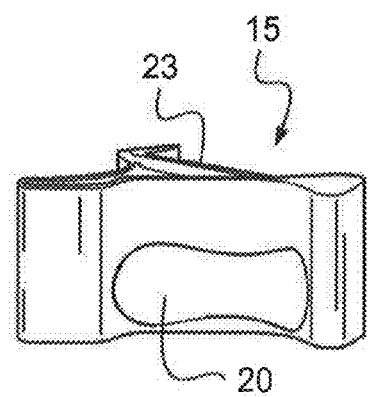

Other features and advantages of the invention will emerge more clearly upon reading the following description, which is given as an illustrative and non-limiting example, and from the accompanying drawings, in which:

FIG. 1 is a perspective, partially transparent view of a device for electrically heating fluid for a motor vehicle according to the present invention, FIG. 2 is a non-transparent view of the electrical heating device from FIG. 1, from which a fluid outlet housing has been removed, FIG. 3 is partial sectional view along a longitudinal plane of the heating device from FIG. 1, FIG. 4 is a partial sectional view along a transverse plane which is substantially in the centre of the two heating modules of the heating device from FIG. 1, FIG. 5 is a perspective view of the fluid inlet housing of the heating device from FIG. 1, housing a heat sink, FIG. 6 is a view of a radial section through an edge of the heating module, of the fluid inlet housing and of the heat sink from FIG. 5 of the electrical heating device from FIG. 1, FIG. 7 is a partial sectional view, along a plane defined by a diagonal line across the fluid inlet housing, of the fluid inlet housing and of the heat sink of the electrical heating device from FIG. 1, FIG. 8 is a partial cross section along a substantially central plane of the fluid inlet housing and of the heat sink of the electrical heating device from FIG. 1, FIG. 9 is a partial sectional view, along a plane radial to the heating module, of the heating device from FIG. 1 comprising a single electric-current switch, FIG. 10a is a perspective view of the heat sink from FIG. 5, FIG. 10b is a view of the back of the heat sink from FIG. 10a, FIG. 10c is a view similar to FIG. 10a of the heat sink, FIG. 10d is a view similar to FIG. 10b of the heat sink, FIG. 11 shows two electric-current switches fixed to an electric-circuit mounting and a dismantled switch mounting, FIG. 12 shows the electric-current switches, the electric-circuit mounting and the switch mounting from FIG. 11 when assembled, and FIG. 13 shows a simulation of the path of the fluid to be heated between an inlet channel and an outlet channel of a heating device.

In these drawings, substantially like elements have the same reference numerals.

FIG. 1 shows a device for electrically heating fluid for a motor vehicle 1 for a heating and/or air-conditioning apparatus.

The electrical heating device 1 is for example an additional heating device which allows the water to be heated before it enters a water heating circuit for heating the passenger compartment of an electric vehicle. According to another example, the electrical heating device 1 is arranged upstream of an evaporator of an air-conditioning loop capable of operating in heat-pump mode, so as to heat the refrigerant. According to yet another example, the electrical heating device 1 is arranged upstream of a heat exchanger using the coolant from a heat engine as a heat-transfer fluid. An electrical heating device 1 may also be provided upstream of a heat exchanger which is intended to thermally regulate an electrical-energy storage device, sometimes described as a battery pack, for an electric or hybrid vehicle.

The electrical heating device 1 shown comprises a first and a second heating module 2a, 2b, a control means 3, a fluid inlet housing 4 and a fluid outlet housing 5.

As can be better seen from FIG. 2, each heating module 2a, 2b comprises a central core 6, for example a hollow core, and a heating element 7a, 7b in the form of a cylindrical casing surrounding the central core 6 so as to define a circuit for guiding fluid to be heated (such as liquid) between the outer surface of the central core 6 and the inner surface of the casing of the heating element 7a, 7b.

The heating modules 2a, 2b have a substantially cylindrical general shape defined by the casing of the heating element 7a, 7b. The guide circuit is thus axially parallel to the longitudinal axis A of the central core 6 and of the heating element 7a, 7b (FIG. 2).

The heating element 7a, 7b is controlled by the control means 3 for heating the fluid by an exchange of heat between the heating element 7a, 7b and the fluid circulating in the guide circuit 8.

The heating modules 2a, 2b are identical and are arranged side by side so as to be substantially parallel. This side-by-side arrangement allows the size of the heating device 1 to be reduced in the longitudinal direction. Moreover, this arrangement has low thermal inertia and a low head loss.

The heating modules 2a, 2b each have opposing longitudinal ends. The inlet ends are each received in a cavity 9a, 9b in the fluid inlet housing 4 (FIG. 5) and the outlet ends are each received in a cavity in the fluid outlet housing 5.

A fluid inlet channel 10 is formed in the fluid inlet housing 4. The inlet channel 10 communicates with the guide circuit 8 of the first heating module 2a and with the guide circuit 8 of the second heating module 2b.

The fluid inlet housing 4 thus has a substantially parallelepiped base equipped with a first and a second cavity 9a, 9b which are cylindrical and have a spherical base for receiving the respective inlet ends of the heating modules 2a, 2b. The fluid inlet housing 4 also comprises a projecting fluid-admission tube 11 of the electrical heating device 1. The inlet channel 10 thus brings the admission tube 11 into fluid communication with two cavities 9a, 9b in parallel.

Likewise, a fluid outlet channel 28 is formed in the fluid outlet housing 5 and communicates with the guide circuit 8 of the first heating module 2a and with the guide circuit 8 of the second heating module 2b.

As can be seen from FIG. 1, the fluid outlet housing 5 has substantially the same shape as the fluid inlet housing 4. Said housing thus has a substantially parallelepiped base equipped with two cavities for receiving the outlet ends of the heating modules 2a, 2b and of a projecting fluid-outlet tube 12 of the electrical heating device 1 intended to be connected to a heated fluid circuit. The outlet and inlet housings 5, 4 are thus symmetrically connected to two opposing ends of the heating modules 7a, 7b.

The control means 3 of the heating element 7a, 7b comprises an electric-circuit mounting 13, two electric-current switches 14a, 14b and a heat sink 15.

The electric-current switches 14a, 14b are respectively electrically connected to the heating elements 7a, 7b of the respective heating modules 2a, 2b via the electric-circuit mounting 13 (FIGS. 11 and 12).

The electric-current switches 14a, 14b are electrical or electronic components. The electric-current switches 14a, 14b comprise for example a metal-oxide-semiconductor field-effect transistor, commonly referred to by the acronym "MOSFET". In another example, the electric-current switches 14a, 14b comprise an insulated-gate bipolar transistor, commonly referred to by the acronym "IGBT".

The implementation of each heating element 7a, 7b is controlled by respective electric-current switches 14a, 14b, the opening and/or the closure of which is controlled by a microcontroller with pulse-width modulation (PWM) for allowing and/or prohibiting the implementation of the heating element 7a, 7b to which it is connected according to a heating setpoint.

Although it is described that the control module 3 comprises an electric-current switch 14a, 14b dedicated to controlling a heating element 7a, 7b, it is also conceivable to provide a single electric-current switch for controlling the two heating elements 7a, 7b. Two electric-current switches are provided for security to ensure that if one of said switches malfunctions, the other switch can ensure the use of a heating element.

The electric-current switches 14a, 14b comprise a base plate 16 (that is to say a tab on the back of the switch) made of thermally conductive material. The surface of the base plate 16 is provided so as to be sufficiently large, and covers for example the entire surface of the electric-current switch 14a, 14b.

The electric-circuit mounting 13, such as a printed circuit board (PCB), supports the electronic and/or electrical components. Other than the electric-current switches 14a, 14b, these electronic and/or electrical components may for example include a microcontroller, electric contacts connecting the heating elements 7a, 7b to the electric-current switches 14a, 14b, high-voltage power connectors 17 and a low-voltage power connector and data-bus connector 18 (FIG. 2). The electric contacts are for example supported by a face of the electric-circuit mounting 13 which is opposite the face supporting the microcontroller, for example.

The heat sink 15 has a first surface 20, which delimits the inlet channel 10 at least in part, and a second surface 19, outside the inlet channel 10, in thermal contact with the two base plates 16 of the two electric-current switches 14a, 14b. The first surface 20 is thus intended to be in contact with the fluid circulating in the inlet channel 10 of the fluid inlet housing 4, while the second surface 19 is pressed against the base plates 16 of the electric-current switches 14a, 14b. Since the fluid is colder when it arrives in the fluid inlet housing 4 than when it is output from the heating modules 2a, 2b, this fluid which is still "cold" is utilised for dissipating the heat generated by the electric-current switches 14a, 14b by heat conduction into the heat sink 15 and by an exchange of heat with the fluid. For example, between 2 and 10 W can be removed in the fluid.

The heat sink 15 has for example a general shape which extends between the cavities 9a, 9b in the fluid inlet housing 4 (FIG. 10a, 10b, 10c, 10d). The shape of the heat sink thus fits closely in part to the radial periphery of the cylindrical cavities 9a, 9b which receive the heating modules 2a, 2b.

The first surface 20 of the heat sink 15 is for example formed in a pipe of the inlet channel 10 connecting the first cavity 9a to the second cavity 9b in the fluid inlet housing 4 (FIGS. 6, 7, 8, 10c and 10d). The fluid-admission tube 11 and said pipe are for example aligned on a single axis which passes substantially diagonally through the fluid inlet housing 4 (FIG. 6). The inlet channel 10 is thus defined by the fluid-admission tube 11, the pipe of the heat sink 15 and the cavities 9a, 9b in the fluid inlet housing 4.

The fluid thus flows from the fluid-admission tube 11, into the inlet channel 10, then in parallel in the guide circuits 8 of the heating modules 2a, 2b and then leaves again through the outlet channel 28. An example of the path of the fluid in a heating device from an inlet channel 10 to an outlet channel 28 is shown in FIG. 13.

It is further provided that the control module 3 comprises a switch mounting 21 receiving the two electric-current switches 14a, 14b. The switch mounting 21 has an opening 22 exposing the base plates 16 of the two electric-current switches 14a, 14b (FIGS. 1, 11 and 12).

The heat sink 15 comprises a receiving portion 23 (that is to say a part acting as a base and forming a mounting or a support) to receive the switch mounting 21. The second surface 19 is for example a lateral face of this receiving portion 23 (FIGS. 3, 4, 8, 10a and 10c).

The receiving portion 23 has a compartment equipped with an axial stop and two transverse stops for the switch mounting 21. Once the switch mounting 21 is inserted into the receiving portion 23, the opening 22 in the switch mounting 21 is oriented opposite the second surface 19 of the heat sink 15 so that the base plates 16 of the electric-current switches 14a, 14b are in thermal contact with the receiving portion 23 of the heat sink 15.

The heat sink 15 is received in a compartment having a shape that complements the fluid inlet housing 4, which closes the receiving portion 23 behind the switch mounting 21 (FIG. 5).

The heat sink 15 comprises a metal material which is a good thermal conductor, such as an aluminium alloy. The heat sink 15 is for example obtained by casting. It is arranged in the body of the fluid inlet housing 4. The body of the fluid inlet housing 4, for example made of plastics material, may be over-moulded onto the heat sink 15. The sealing between the heat sink 15 and the body of the fluid inlet housing 4 is ensured by over-moulding or by an adhesive or a silicone gel for example, if the heat sink 15 is inserted into the body of the fluid inlet housing.

In order to further improve the heat transfer, the heating device 1 may comprise a thermal interface 24 interposed between the heat sink 15 and the base plates 16 of the electric-current switches 14a, 14b (FIG. 9). The thermal interface 24 is an electrically insulating and thermally conductive film. The thermal interface 24 comprises for example a phase-change material and has for example a thermal conductivity of approximately 1.5 W/m·K. Phase-change materials have the advantage of being better thermal conductors when temperatures are higher.

Furthermore, the switch mounting 21 may comprise a means 25 for being removably fixed to the electric-circuit mounting 13 of the control means 3. The removable fixing means 25 comprises for example two slides arranged on two opposite sides, upstream of the opening 22, capable of being inserted onto the edge of the electric-circuit mounting 13. The slides are equipped with stops allowing the positioning of the switch mounting 21 on the electric-circuit mounting 13 to be blocked, while leaving the opening 22, and therefore the base plates 16 of the electric-current switches 14a, 14b, accessible.

It is also provided that the fluid inlet housing 4 comprises a first means 26 for positioning the electric-circuit mounting 13 and that the fluid outlet housing 5 has a second means 27 for positioning the electric-circuit mounting 13 (FIG. 1).

The first positioning means 26 comprises for example two clips attached to the body of the fluid inlet housing which attach the electric-circuit mounting 13 in a removable manner. Likewise, the second positioning means 27 comprises for example two clips attached to the body of the fluid outlet housing which attach the electric-circuit mounting 13 in a removable manner. The four clips grip the electric-circuit mounting 13 at the four corners.

Thus, the switch mounting 21 allows the electric-current switches 14a, 14b to be positioned on the electric-circuit mounting 13 when the electric-circuit mounting 13 and the inlet housing 4 and outlet housing 5 are being assembled and when the heating device 1 is being assembled. The switch mounting 21 also allows the electric-current switches 14a, 14b to be protected against any mechanical impacts, particularly when they need to be handled and/or while they are being assembled. Finally, the switch mounting 21 forms a robust mechanical interface between the electric-current switches 14a, 14b, the electric-circuit mounting 13 and the other elements of the heating device 1.

The heating device 1 is thus more reliable, without increasing the size thereof. In addition, the heat energy produced by the electric-current switches 14a, 14b contributes to heating the fluid passing through the heat sink.

The invention claimed is:

1. A heating device for electrically heating fluid for a motor vehicle, the heating device comprising:
   at least one heating module (2a, 2b) comprising at least one heating element (7a, 7b) and defining a guide circuit (8) for the fluid to be heated,
   a means (3) for controlling the heating element (7a, 7b) comprising an electric-current switch (14a, 14b) connected to the heating element (7a, 7b) and a heat sink (15) having a first surface (20) which is intended to be in contact with the fluid to be heated and a second surface (19) which is in thermal contact with a base plate (16) of the electric-current switch (14a, 14b), and
   a fluid inlet housing (4) in which an inlet channel (10) for the fluid to be heated is formed, the inlet channel (10) communicating with the circuit (8) for guiding the fluid, the first surface (20) of the heat sink (15) delimiting the inlet channel (10) at least in part, the second surface (19) being outside the inlet channel (10).

2. A heating device according to claim 1, wherein the second surface (19) is formed in a receiving portion (23) of the heat sink (15) which receives a switch mounting (21) of the control module (3) housing at least one electric-current switch (14a, 14b), the switch mounting (21) having an opening (22) exposing the base plate (16) of the electric-current switch (14a, 14b) and the switch mounting (21) being received in the receiving portion (23) with the opening (22) being oriented opposite the second surface (19).

3. A heating device according to claim 2, wherein the switch mounting (21) comprises a means (25) for being removably fixed to an electric-circuit mounting (13) of the control means (3).

4. A heating device according to claim 1, comprising two heating modules (2a, 2b), the fluid inlet housing (4) having a first cavity (9a) which receives an inlet end of the first heating module (2a) and a second cavity (9b) which receives an inlet end of the second heating module (2b), the inlet channel (10) connecting the cavities (9a, 9b) in parallel.

5. A heating device according to claim 4, wherein the first surface (20) of the heat sink (15), which delimits the inlet channel (10) at least in part, is formed by the inner surface of a pipe of the inlet channel (10) connecting the first cavity (9a) in the fluid inlet housing (4) to the second cavity (9b) in the fluid inlet housing (5).

6. A heating device according to claim 4, the general shape of the heat sink (15) extends between the cavities (9a, 9b) in the fluid inlet housing (4).

7. A heating device according to claim 1, wherein the heat sink (15) comprises a metal material.

8. A heating device according to claim 1, comprising a thermal interface (24) interposed between the heat sink (15) and the base plate (16) of the electric-current switch (14a, 14b).

9. A heating device according to claim 8, wherein the thermal interface (24) is an electrically insulating and thermally conductive film.

10. A heating device according to claim 9, wherein the thermal interface (24) comprises a phase-change material.

11. A heating device according to claim 1, wherein the fluid inlet housing (4) comprises a first means (26) for positioning an electric-circuit mounting (13) of the control means (3).

12. A heating device according to claim 11, comprising a fluid outlet housing (6) in which an outlet channel (28) for the fluid is formed, the outlet channel (28) communicating with the circuit (8) for guiding the fluid, the fluid outlet housing (6) and the fluid inlet housing (5) being respectively connected to the opposite ends of the heating modules (2a, 2b).

13. A heating device according to claim 12, wherein the fluid outlet housing (6) has a second means (27) for positioning the electric-circuit mounting (13) of the control means (3).

14. A heating device and/or air-conditioning apparatus for a motor vehicle, comprising the electrical heating device (1) of claim 1.

15. A heating device according to claim 5 wherein the general shape of the heat sink (15) extends between the cavities (9a, 9b) in the fluid inlet housing (4).

16. A heating device for electrically heating fluid for a motor vehicle, the heating device comprising:
   at least one heating module (2a, 2b) comprising at least one heating element (7a, 7b) and defining a guide circuit (8) for the fluid to be heated,
   a means (3) for controlling the heating element (7a, 7b) comprising an electric-current switch (14a, 14b) connected to the heating element (7a, 7b) and a heat sink (15) having a first surface (20) which is intended to be in contact with the fluid to be heated and a second surface (19) which is in thermal contact with a base plate (16) of the electric-current switch (14a, 14b),
   wherein the second surface (19) is formed in a receiving portion (23) of the heat sink (15) which receives a switch mounting (21) of the control module (3) housing at least one electric-current switch (14a, 14b), the switch mounting (21) having an opening (22) exposing the base plate (16) of the electric-current switch (14a, 14b) and the switch mounting (21) being received in the receiving portion (23) with the opening (22) being oriented opposite the second surface (19).

17. A heating device for electrically heating fluid for a motor vehicle, the heating device comprising:
   a first heating module (2a) and a second heating module (2b), each one of the first and second heating modules (2a, 2b) comprising a respective element (7a, 7b) and defining a guide circuit (8) for the fluid to be heated,
   a means (3) for controlling each respective one of the heating elements (7a, 7b) comprising a electric-current switch (14a, 14b) connected to the respective heating element (7a, 7b) and a heat sink (15) having a first surface (20) which is intended to be in contact with the fluid to be heated and a second surface (19) which is in thermal contact with a base plate (16) of the respective electric-current switch (14a, 14b),
   the fluid inlet housing (4) having a first cavity (9a) which receives an inlet end of the first heating module (2a) and a second cavity (9b) which receives an inlet end of the second heating module (2b), the inlet channel (10) connecting the cavities (9a, 9b) in parallel.

* * * * *